July 27, 1926.
F. W. WOESSNER ET AL
1,594,290
WATERING TROUGH
Filed June 17, 1925
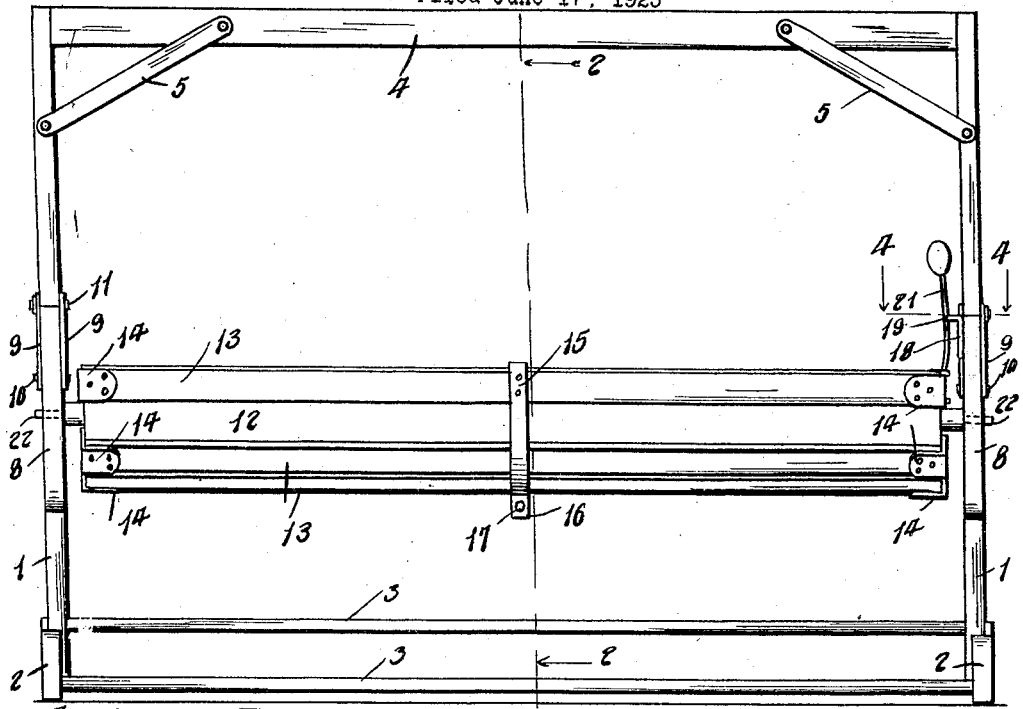
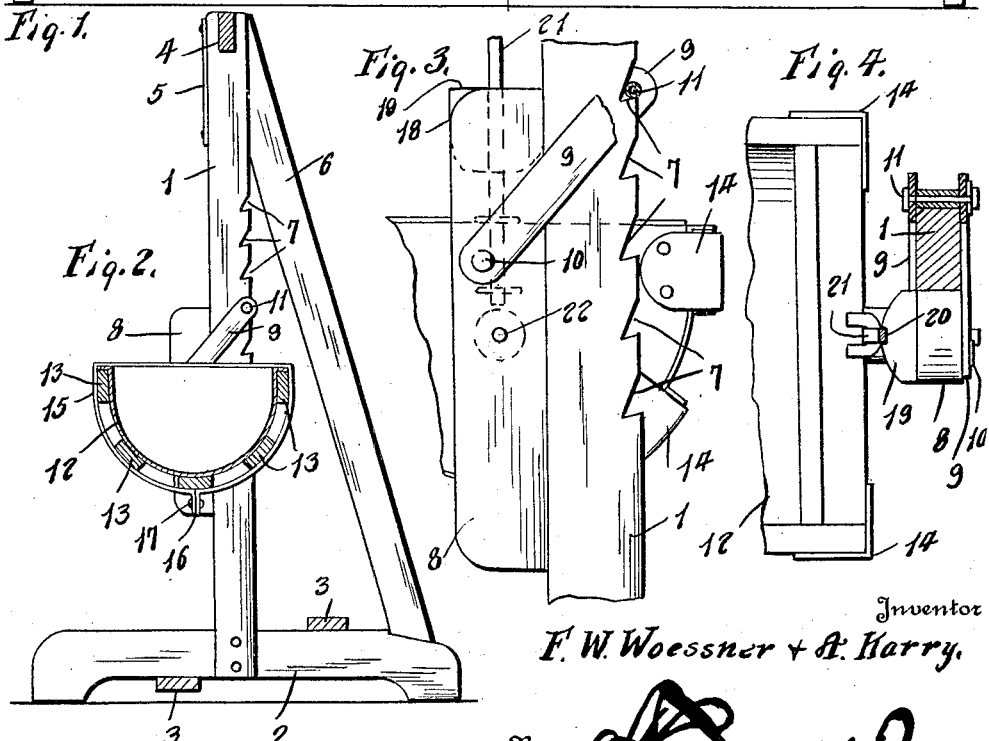
Inventor
F. W. Woessner + A. Harry.

Patented July 27, 1926.

1,594,290

UNITED STATES PATENT OFFICE.

FREDERICK W. WOESSNER AND ALBERT W. KARRY, OF STEPHENSON, MICHIGAN.

WATERING TROUGH.

Application filed June 17, 1925. Serial No. 37,765.

The invention relates to watering troughs and is particularly adapted for use with live stock in the winter time when it is necessary to keep the stock in the barn and barn-yard, the watering trough being adapted to be installed in the barn-yard and is provided with means by which the trough may be raised from time to time as the accumulation of manure and other trash in the barn-yard increases so that the trough may be raised at a proper height for use by the stock and be arranged at such a height that danger of the trough being fouled by manure and trash will be avoided.

Another object of the invention is the provision of means by which the trough may be inverted to discharge its contents for cleaning it and also to discharge ice that may form in the trough, provision being made by which the trough is held in an upright position to contain the water.

The construction and operation of the invention as well as its advantages will be described in detail hereinafter, and the device will be found illustrated in the accompanying drawings, in which—

Figure 1 is a front view in elevation of the improved watering trough,

Figure 2 is a transverse sectional view on a plane indicated by the line 2—2 of Figure 1, Figure 3 is a fragmental detail on an enlarged scale showing the means for holding the trough in adjusted positions, and Figure 4 a sectional detail on a plane indicated by the line 4—4 of Figure 1, the parts being shown on an enlarged scale.

In the drawings similar reference characters will be used to designate corresponding parts throughout the several views.

The improved watering trough includes a frame having uprights 1 secured to foot pieces 2, said foot pieces being connected by bars 3, while the upper ends of the uprights 1 are connected by a longitudinal beam 4, 5 indicating corner braces connecting uprights 1 and beam 4. 6 indicates braces connecting the upper end of each of the uprights 1 and an outer end of foot piece 2. Each of the uprights 1 is provided with a series of notches 7, the notches in the two uprights being alined. Slidably mounted on each of the uprights 1 is a supporting member consisting of a plate 8, and each of the supporting members 8 is held in adjusted position on the corresponding upright 1 by means of a clamping member comprising a link 9 on each side of the supporting member and upright 1 pivotally engaging the supporting member 8 as shown at 10, and having their free ends connected by a bolt 11 that is adapted to seat in the notches 7 to support the member 8 relatively to the upright 1.

The trough 12 is preferably made of sheet metal or may be obviously made of any suitable material, and may be reinforced by means of longitudinal strips 13 having their ends secured to the ends of the trough by means of angle pieces 14, and the portions of said reinforcing strips 13 intermediate of their ends engaged by a strap 15 secured across the top of the trough and around the sides thereof and having its two ends formed with offset portions 16 that are secured together by means of a bolt or rivet 17.

Secured to one of the supporting members 8 is an angular bracket 18 having its offset portion 19 provided with a notch 20, and the trough 12 has a spring arm 21 that is adapted to seat in notch to hold the trough in an upright position.

The trough 12 is journaled for rotation in the suporting members or plates 8 as shown at 22, and it will be apparent that by releasing the spring arm 21 from engagement with the notch 20 the trough may be inverted to dump the contents thereof when it is desired to clean the trough or to remove ice therefrom in the winter time.

It will also be apparent that by installing the trough in a barn-yard as the accumulation of manure and trash in the barn-yard increases in height the trough may be raised from time to time by adjustment of the clamping members consisting of the links 9 and their associated parts in the notches 7 so that danger of contamination of the water in the trough with manure and trash will be minimized.

What is claimed is:—

1. A watering trough comprising a supporting frame including standards having series of notches therein, supports slidably mounted on said standards, clamping members pivotally engaging said supports and adapted to engage the notches in the standards to hold the supports in adjusted positions, and a trough mounted to rotate on said supports.

2. A watering trough comprising a supporting frame including standards, each of said standards having a series of notches therein, a support slidably mounted on each standard, a clamping member pivotally engaging the support and adapted to engage the notches in the standard to hold the support in adjusted positions, a trough mounted to rotate on said supports, and means to hold the trough in an upright position.

3. A watering trough comprising a supporting frame including standards, supports slidably mounted on said standards, means to secure said supports in adjusted positions on the standards, a stop on one of said supports, and a spring arm on the trough and adapted to engage said stop to hold the trough in an upright position.

In testimony whereof we affix our signatures.

FREDERICK W. WOESSNER.
ALBERT W. KARRY.